(12) United States Patent
Kwok

(10) Patent No.: US 7,658,410 B2
(45) Date of Patent: Feb. 9, 2010

(54) PASSENGER RESTRAINING HARNESS

(76) Inventor: Ming Yat Kwok, 1646 Frances St., Vancouver, British Columbia (CA) V5L 1Z4

( * ) Notice: Subject to any disclaimer, the term of this patent is extended or adjusted under 35 U.S.C. 154(b) by 448 days.

(21) Appl. No.: 11/319,935

(22) Filed: Dec. 29, 2005

(65) Prior Publication Data

US 2007/0152436 A1    Jul. 5, 2007

(51) Int. Cl.
*B60R 21/02* (2006.01)
*A47D 15/00* (2006.01)

(52) U.S. Cl. .................. 280/748; 280/749; 297/464
(58) Field of Classification Search ............... 280/748, 280/749; 296/464; 297/464
See application file for complete search history.

(56) References Cited

U.S. PATENT DOCUMENTS

| 2,025,822 | A |  | 12/1935 | Pryor |  |
|---|---|---|---|---|---|
| 3,692,327 | A |  | 9/1972 | Barrick et al. | 280/150 B |
| 4,278,273 | A |  | 7/1981 | Schiff | 280/802 |
| 4,569,534 | A |  | 2/1986 | Nalbandyan et al. | 280/742 |
| 4,592,523 | A | * | 6/1986 | Herndon | 244/122 AG |
| 5,226,672 | A |  | 7/1993 | Husted | 280/749 |
| 5,529,341 | A | * | 6/1996 | Hartigan | 280/749 |
| 5,547,219 | A |  | 8/1996 | Ha | 280/749 |
| 6,443,489 | B1 | * | 9/2002 | Ehrenberger et al. | 280/749 |
| 6,502,859 | B1 | * | 1/2003 | Svetlik | 280/749 |
| 6,554,339 | B1 | * | 4/2003 | Moore | 296/24.43 |
| 6,672,619 | B1 | * | 1/2004 | Ennerdal et al. | 280/749 |
| 7,303,209 | B2 | * | 12/2007 | Kwok | 280/749 |

* cited by examiner

*Primary Examiner*—Toan C To

(57) ABSTRACT

A passenger restraining harness has a web (30) which during ready position stored within the backrest of a seat (10) and there is also a headrest (31) rested on top of the backrest covering the exit opening of the web, during the course of an accident, the propelling device (50) will receive commend from the sensor to propel carrying cams (80) (801)(802)(803) with the web and headrest along the looped channels (40) to the engaged positions at the anchor brackets (60) effectively restraining a person (11), the cable guides (20) with the tightening cable (32) function together to tighten up middle section of the web (30). Showing is the inside section of a vehicle (9).

15 Claims, 8 Drawing Sheets

FIG 6
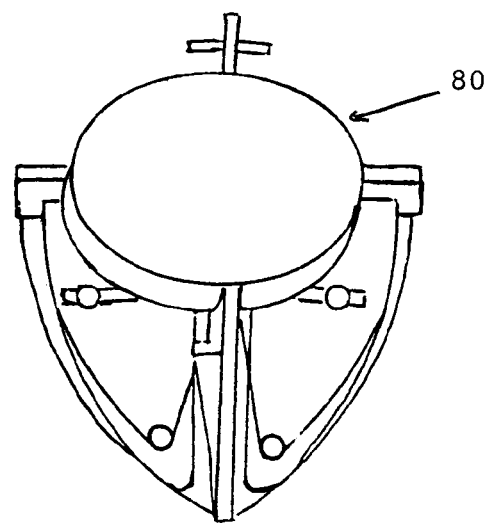
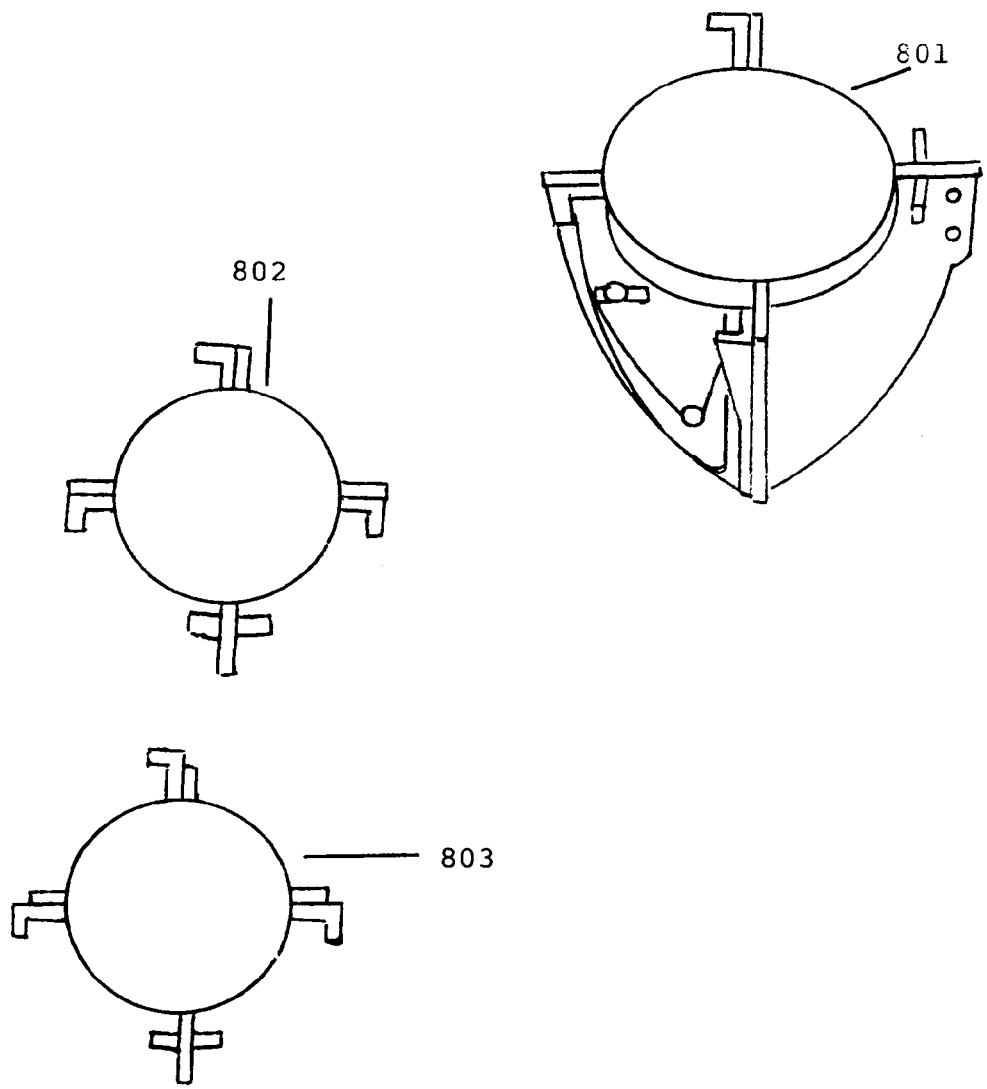

PASSENGER RESTRAINING HARNESS

BACKGROUND

1. Field of Invention

The present invention relates to passengers restraining harness during vehicle accident

2. Description of Prior Art

Seatbelts and air bags are the protection devices for the present day vehicle occupants. Sadly, in America and all over the world thousands of fatalities still occur every day and many more thousands more are seriously injured. While seatbelts do have some protection but are often ineffective at times either when occupants do not put them on for various reasons or they are worn incorrectly or yet the seatbelt system malfunction. The most common malfunction of the seatbelt system is the shoulder belt, it does not seen to be able to lock up when needed the most. Studies show that violent movement during an accident results in most injuries. Seatbelts are not the solution, then air bag was invented, one airbag first, then two and then four, there will be more airbags yet to come in the newer vehicles. Airbags help cushion the driver against the steering column during the initial crash and not much more, the human body still has to endure the violent thrust during the collision and that is the major cause of injuries and fatalities. Airbag helps during the initial impact but offer no help at all if there is any subsequent collision following. The cost to replace a spent airbag and repair the damages caused by the discharge of the airbags is huge.

In U.S. Pat. No. 6,502,859 B 1 (2003) issued to Robert W. Svetlik describes a back seat 3 nets enclosure to protect the occupants of a vehicle during an accident, but nothing illustrated about restraining occupants from thrust against the ceiling and the rear window.

In U.S. Pat. No. 5,226,672 issued to Royce H. Husted (1993) is disclosing a web restraining about ⅓ the body of a driver while holding the steering wheel near the bottom, chances are, during an accident, the lower part of the body will slip down and thrust forward and the web might not be able to stop that thrust. Some drivers prefer to put one or both their hands on top of the steering wheel while driving, then the web will only cover the head and the neck of that person and that can be detrimental.

The present invention deploys a see-through web with a headrest stored in the cavity of the backrest of a seat or in a tailor made case placed behind the passenger. During an accident the web with the headrest is deployed by a couple of propelling devices which are electronically controlled by sensors to shoot simultaneously, or by a multiple variable outlets shooting apparatus (refer to Ser. No. 11/098,196) along the looped channels to the stop point at the anchor brackets, effectively restraining the passenger from head to legs. The cable guide and the cable functioning to tighten up mid-section of the web near the abdomen area. The passenger restraining harness does not need the participation of the passengers and is simple, low cost to make and can be reset and reuse again.

OBJECT OF THE INVENTION

A principle object of the invention is to provide an effective safety restraining harness for the passengers preventing violent thrust during an accident.

Another object of the invention is to provide protection for the passengers without needing their participation.

Another object of the invention is to provide restraining protection from head to feet of the passenger.

Another object of the invention is to provide a restraining harness that after deployment can be reset and reused again.

Yet another object of the invention is to provide a restraining harness that is effective, simple, easy to make and rather inexpensive to build and use materials already in the marketplace.

BRIEF DESCRIPTION OF THE DRAWINGS

These and other objects and advantages of the invention will be apparent upon reading the following description in conjunction with the drawing, in which:

FIG. 6 is the carrying cam viewing from different positions.

DESCRIPTION OF THE PREFERRED EMBODIMENT

Figure 1:
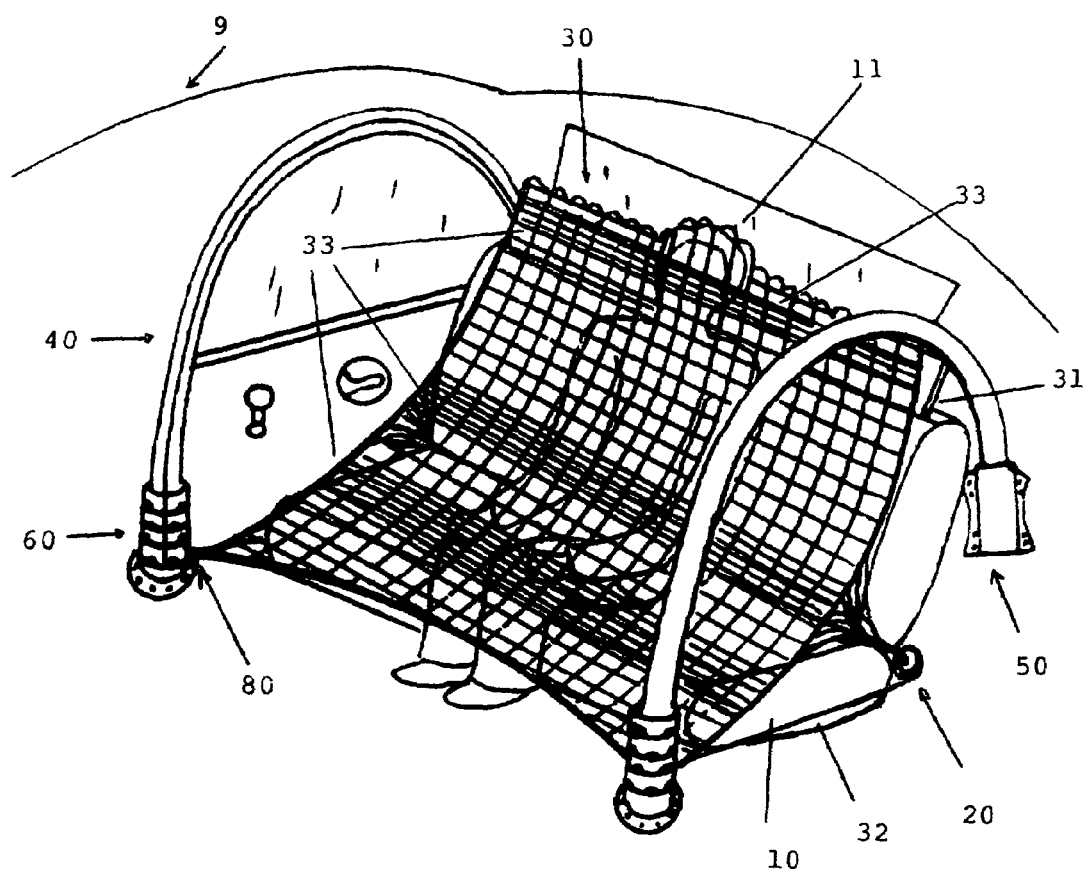
FIG. 1 is the frontal view of a passenger sitting in a seat in part of a vehicle with the restraining harness fully deployed.

Referring to FIG. 1 is the frontal view of a passenger (11) sitting in a seat (10) with the restraining harness (30) and the headrest (31) fully deployed in part of a vehicle (9). Showing also the propelling device (50) propelled the restraining web (30) with localized reinforcement portions along the looped channels (40) to the anchor brackets (60). Cable guide (20) and adjusting cable (32) function as means to tighten up mid section of the web.

Figure 2:
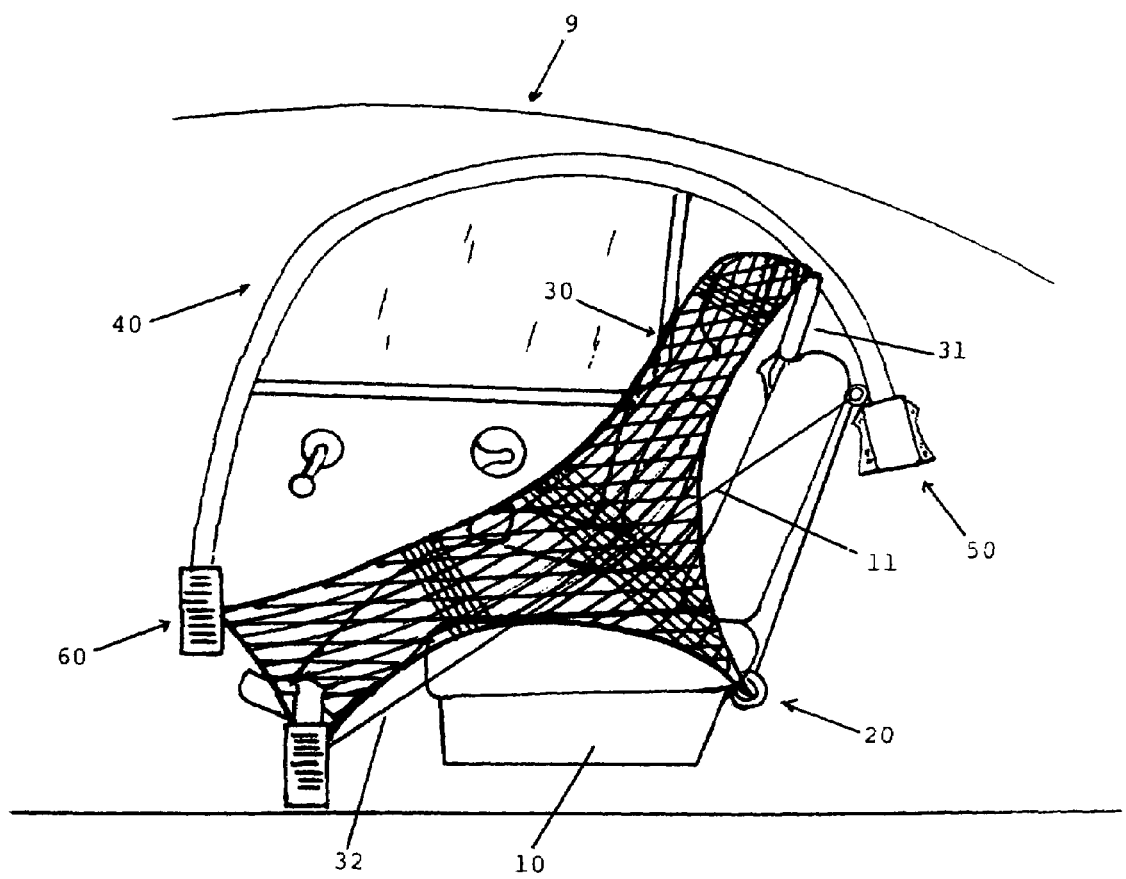
FIG. 2 is the side view of a passenger sitting in a seat in part of a vehicle with the restraining harness fully deployed.

Referring to FIG. 2 is the side view of a passenger (11) sitting in a seat (10) with the web and the headrest (31) fully deployed in part of a vehicle (9). Showing also the propelling device (50) propelled the restraining web (30) along the looped channel (40) to the anchor bracket (60). Cable guide (20) and adjusting cable (32) function as means to tighten up mid-section of the web.

Figure 3:
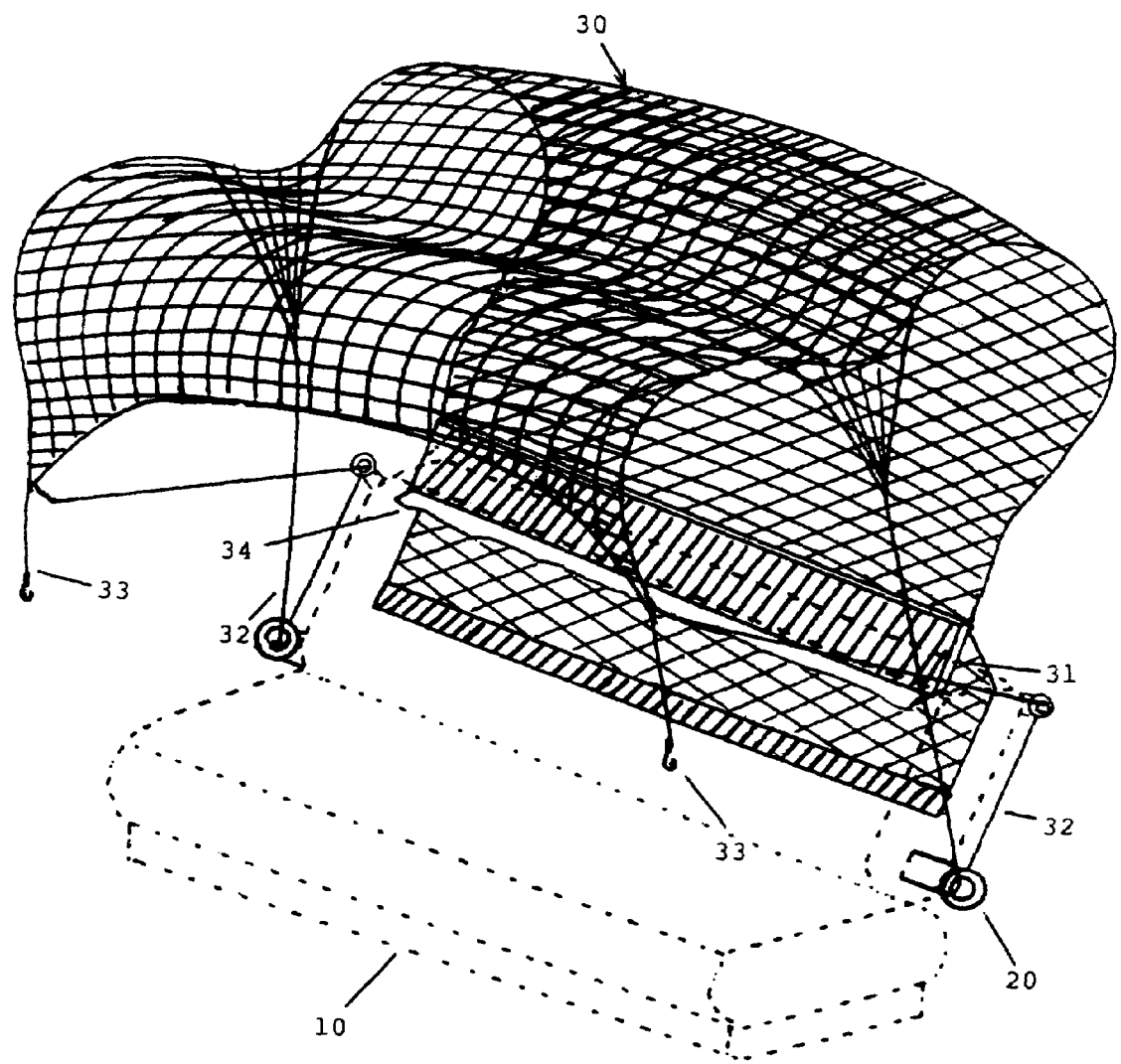
FIG. 3 is the safety restraining web and headrest in full view and the seat in the back ground.

Referring to FIG. 3 is the restraining web (30) along with its hook-up cable (33), adjusting cable (32) and the headrest (31) in full view, the seat (10) is in the back ground. Showing also the one way cable guide (20) and the flap hinge (34) joining the backrest and the headboard.

Figure 4:
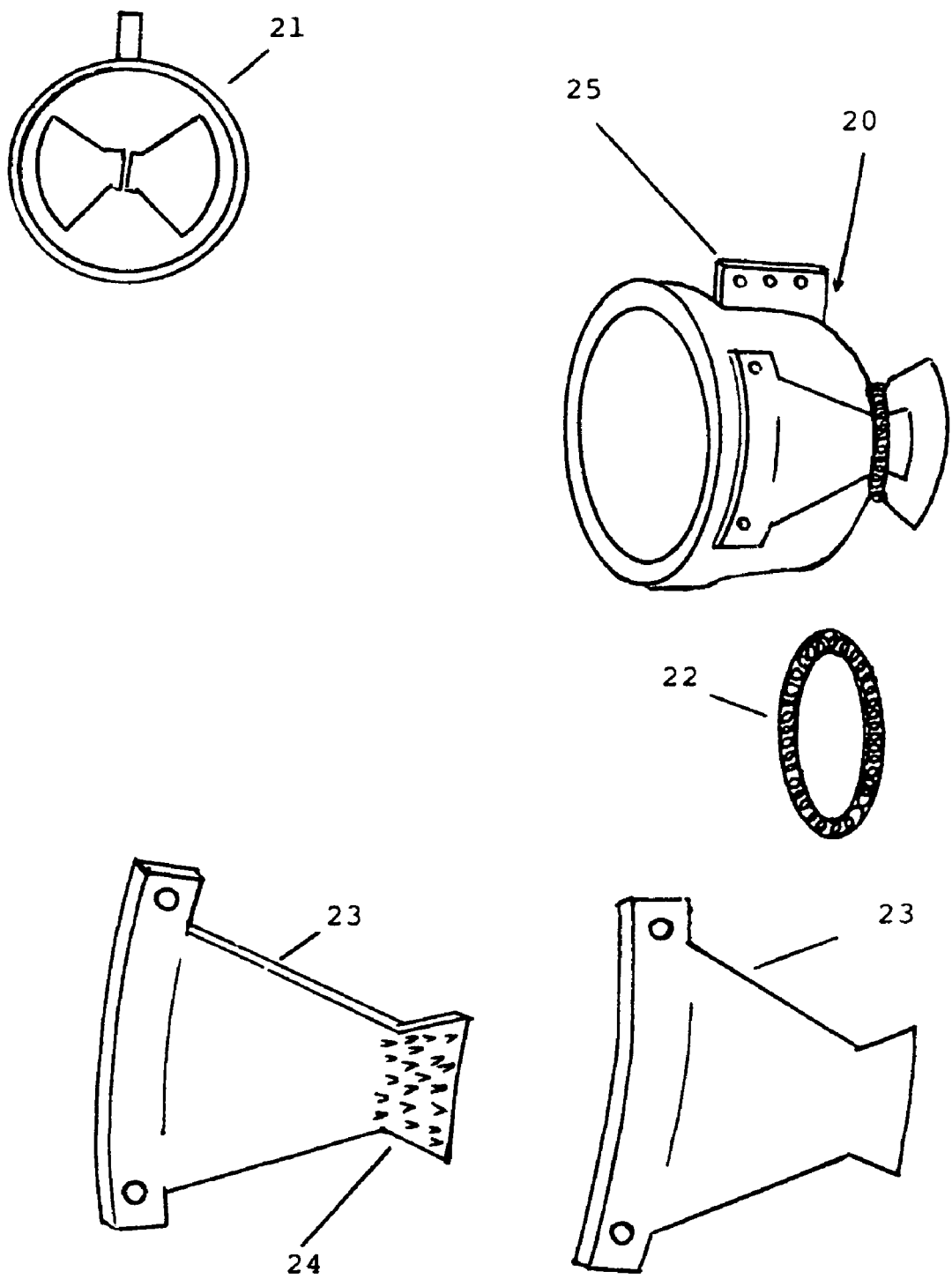
FIG. 4 is the cable guide and with its dismantled parts.

Referring to FIG. 4 is the cable guide (20) with the attach bracket (25), the two loose flaps (23) are retained and tensioned with spring (22) have rasp portions (24) pointing backward to ensure non-return of the cable (31), looking into the feeding mouth is cable guide (21).

Figure 5:
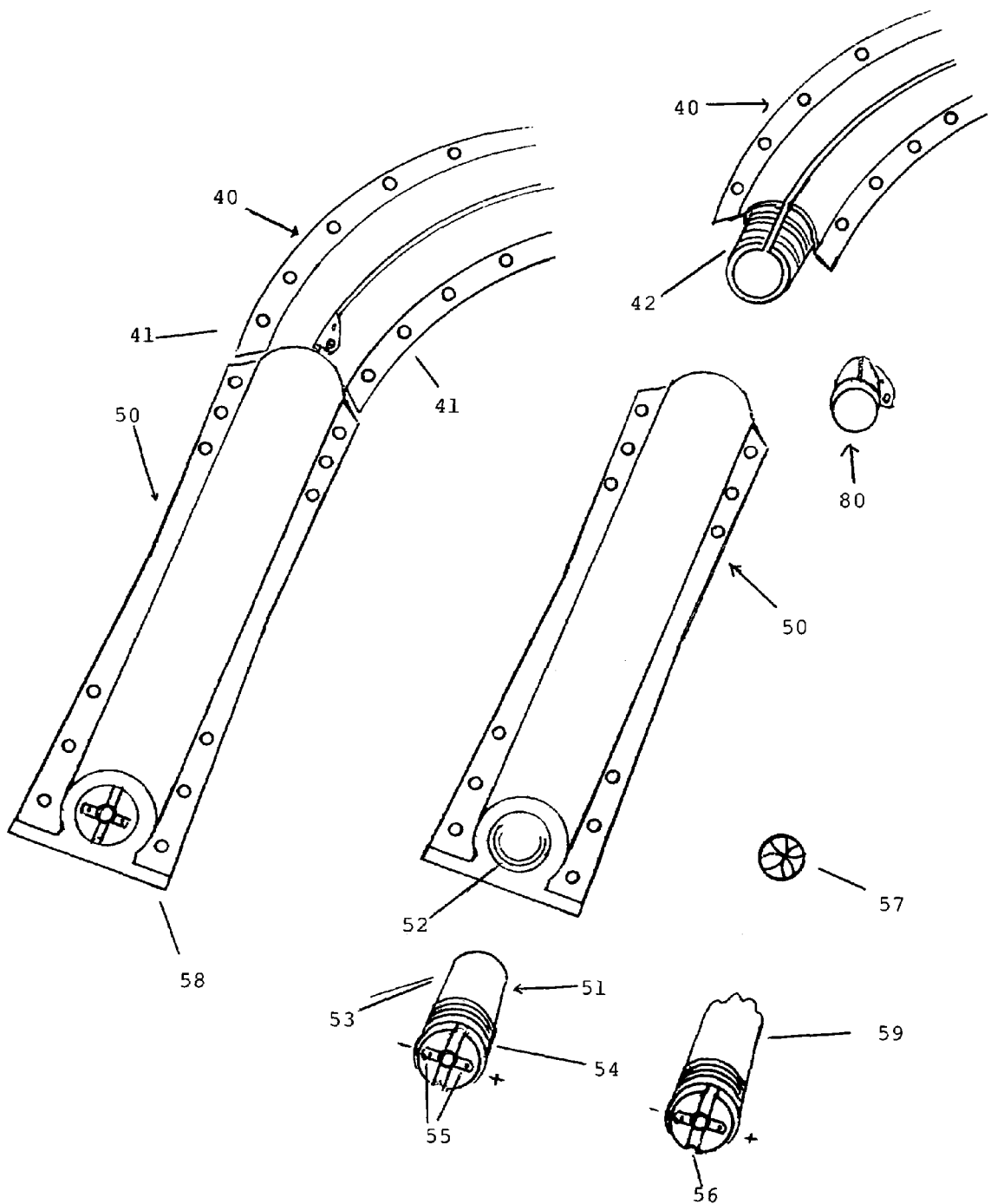
FIG. 5 is the propelling device and with its various parts.

Referring to FIG. 5 is one of the propelling devices (50) joining the looped channel (40) with its base and ridge reinforcement (41), when dismantled are showing the threaded portion (42) where the propelling device (50) fitted onto, threaded inner (52) is where the cartridge (51) with threaded base (54) fitted into. Positive and negative terminals (55) for receiving signal from governing sensors to shoot the bouncing balls (57) which are wrapped with fire-resistance yarns to prevent burn and melt and those balls are to hit the carrying cams (80) which in turn carry the web (30) to the deployed position.

Referring to FIG. 6 is the carrying cam (80) (refer to Ser. No. 11/100,263), carrying cam (801) viewed from a different position. Carrying cam (802) in retracted position when sitting inside the looped channel nearest to the propelling device. Carrying cam (803) in extended position after being bounced to the anchor bracket.

Figure 7:
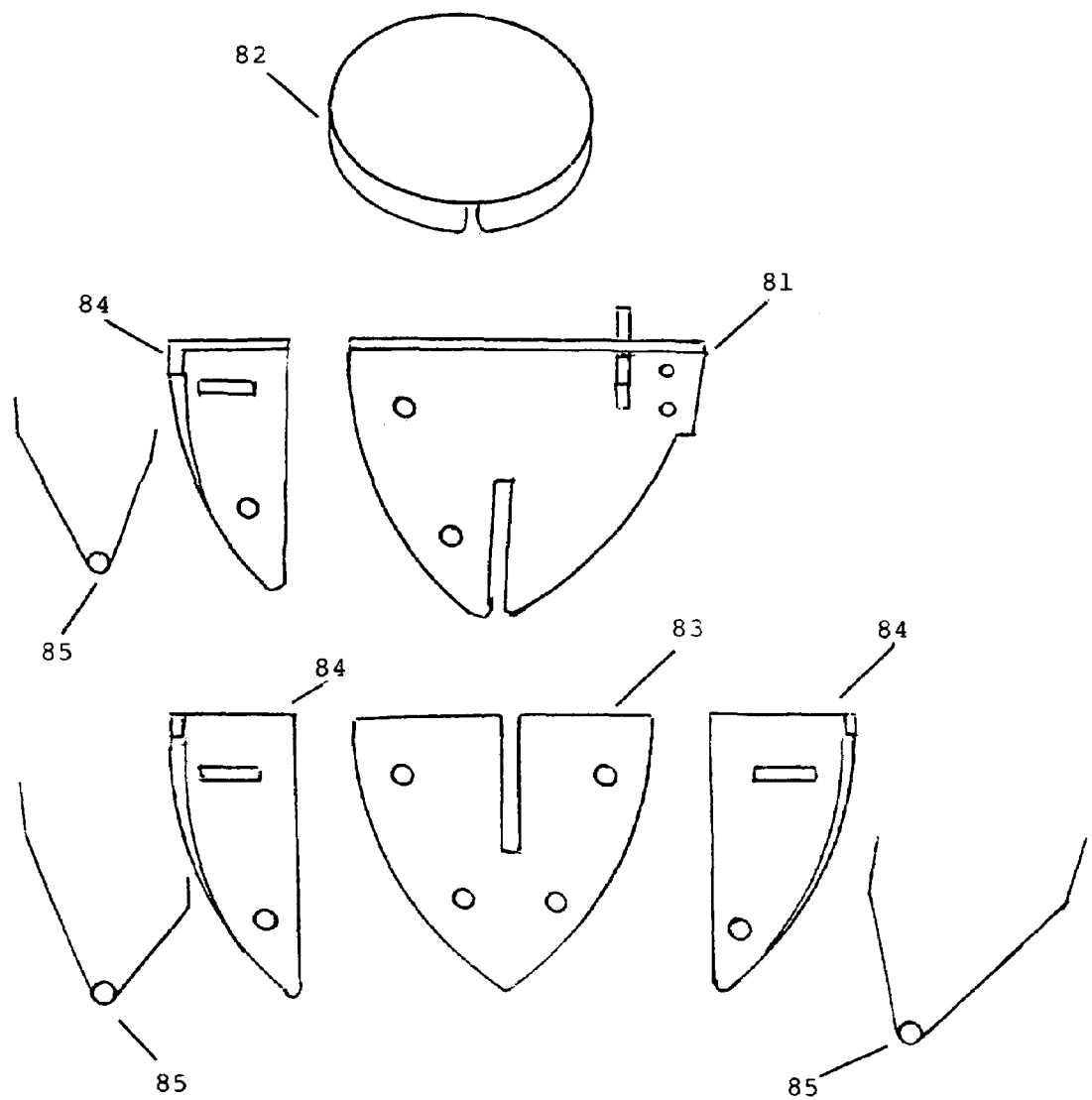
FIG. 7 is the carrying cam (refer to and with its dismantled parts.

Referring to FIG. 7 is showing the dismantled parts of the carrying cam (80) (refer to Ser. No. 11/100,263). Round top (82) accepts the bouncing ball welded together with the stationary plates (81) and (83) which being attached to are the sliding plates (84) which are spring (85) loaded.

Figure 8:
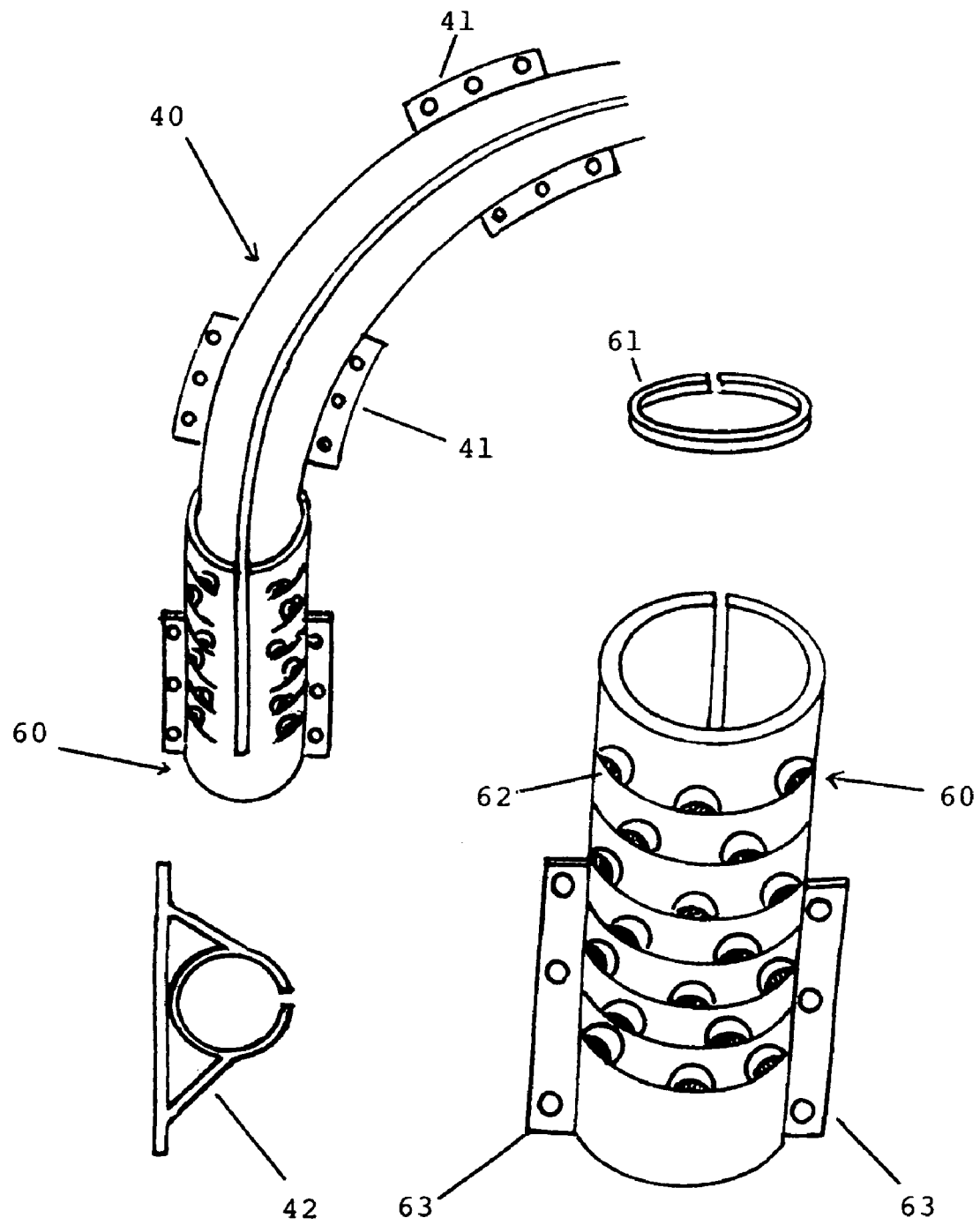
FIG. 8 is the anchor bracket at the end of the looped channel and also when taken apart.

Referring to FIG. 8 is showing the anchor bracket (60) (refer to Ser. No. 11/186,888) attached to the end of the looped channel (40) with base and ridge reinforcement (41) (42) and (63), uniform rolls of dent-ins (62) are functioning as catches for the carrying cam (80).

CONCLUSION

It can now be seen that the present invention solves many of the problems associated with the prior arts. The present invention confines the passenger within the web area therefore prevent the violent thrust of the body during the impact of an accident, effectively protecting the vital organs such as the head, neck and the spine of the passenger, the harness continuing to restrain and protect with any subsequent crash following the first.

The restraining web is see-through so persons restrained fully comprehend the situation and can continue maneuvering and or unhook the web to walk away after the dust have settled.

The present invention does not need the participation of the passengers and will not disintegrate in the process, it can be reset and reuse again, it is simple, easy to make and low cost to mass manufacture and uses materials already in the market place. The present invention can be adapted to all forms of vehicles.

Although the description above contains many specifications, these should not be construed as limiting the scope of the invention but as merely providing support to the illustrations of the preferred embodiment of this invention. For example, the propelling system can be that of a multiple variable outlets shooting apparatus (refer to Ser. No. 11/098,196) especially dealing with more than one propelling device, and the propellant can be that of straight shooting gun powder or C02 cartridge etc.

Thus the scope of this invention should not be determined by the appended claims and their legal equivalents, rather than by the examples given herein.

What is claimed is:

1. A passenger restraining harness system for protecting the occupant of a vehicle against impact from a collision accident, wherein the system comprising: at least one vehicle seat designed for at least one occupant to be seated upon; a restraining web preferably stored inside a backrest of said seat; at least one propelling device to propel said restraining web to a predetermined location; at least one channel for guiding said restraining web to said predetermined location.

2. The system of claim 1, wherein said restraining web includes a headrest said headrest pops out during deployment of said restraining web.

3. The system of claim 1, wherein said web is made of strong, fire-resistant, light weight and flexible material.

4. The system of claim 1, wherein said web is made with strong borders and localized portions for reinforcement.

5. The system of claim 1, wherein said web is deployed by at least one propelling device.

6. The system of claim 5, wherein said at least one propelling device is made of high value steel with strong base and ridge reinforcement said device is threaded both ends to fit in at least one power cartridge and said at least one channel.

7. The system of claim 5, wherein said at least one power cartridge is controlled by electronic sensors to ignite and propel at least one bouncing ball which in turn bounces at least one carrying cam.

8. The system of claim 7, wherein said at least one bouncing ball is wrapped with fire-resistant yarns to prevent burning and melting.

9. The system of claim 1, wherein said at least one channel includes at least one anchor bracket at one end of said at least one channel.

10. The system of claim 9, wherein said at least one anchor bracket having numerous dent-ins preventing reversal of said at least one carrying cam.

11. The system of claim 7, wherein said at least one carrying cam is connected with the mobile end of said web and is propelled along said at least one channel to be locked to said at least one anchor bracket.

12. The system of claim 7, wherein said at least one carrying cam is made of at least two spring-loaded expanding leaves and at least one stationary leaf where said mobile end of said web is connected.

13. The system of claim 12, wherein said spring loaded leaves of said at least one carrying cam said leaves are in retracted position when placed in said at least one channel and said leaves are in expanding position when being bounced to said at least one anchor bracket effectively locking said at least one carrying cam with said web restraining said passenger.

14. The system of claim 1, wherein said at least one channel having base and ridge reinforcement support to minimize distortion.

15. The system of claim 1, wherein said passenger restraining harness further includes a least one adjustment cable guide functioning to tighten up mid-section of said web near the abdomen of said passenger.

* * * * *